(12) United States Patent
Ross et al.

(10) Patent No.: US 11,341,348 B2
(45) Date of Patent: May 24, 2022

(54) HAND BIOMETRICS SYSTEM AND METHOD USING DIGITAL FINGERPRINTS

(71) Applicant: ALITHEON, INC., Bellevue, WA (US)

(72) Inventors: Robert Saxon Ross, Bellevue, WA (US); Evan Murphy Keech, Bellevue, WA (US); David Justin Ross, Bellevue, WA (US); Will Charles Shannon, Bellevue, WA (US); Mark Tocci, Bellevue, WA (US)

(73) Assignee: ALITHEON, INC., Bellevue, WA (US)

( * ) Notice: Subject to any disclaimer, the term of this patent is extended or adjusted under 35 U.S.C. 154(b) by 2 days.

(21) Appl. No.: 17/209,469

(22) Filed: Mar. 23, 2021

(65) Prior Publication Data

US 2021/0295010 A1    Sep. 23, 2021

Related U.S. Application Data

(60) Provisional application No. 63/015,441, filed on Apr. 24, 2020, provisional application No. 62/993,693, filed on Mar. 23, 2020.

(51) Int. Cl.
*G06K 9/00* (2022.01)

(52) U.S. Cl.
CPC ..... *G06K 9/00026* (2013.01); *G06K 9/00087* (2013.01); *G06K 9/00919* (2013.01); *G06K 9/00926* (2013.01)

(58) Field of Classification Search
CPC .......... G06K 9/00026; G06K 9/00087; G06K 9/00919; G06K 9/00926; G06K 9/00885;
(Continued)

(56) References Cited

U.S. PATENT DOCUMENTS

| 4,218,674 A | 8/1980 | Brosow et al. |
| 4,423,415 A | 12/1983 | Goldman |

(Continued)

FOREIGN PATENT DOCUMENTS

| DE | 102006005927 A1 | 8/2007 |
| EP | 0439669 A2 | 8/1991 |

(Continued)

OTHER PUBLICATIONS

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.

(Continued)

*Primary Examiner* — Abhishek Sarma
(74) *Attorney, Agent, or Firm* — Cozen O'Connor

(57) ABSTRACT

Hand biometric systems and methods use digital fingerprints generated from images of at least a portion of hand. These systems and methods may perform various digital fingerprint related processes including induction (acquiring of the hand biometric data, generation of a digital fingerprint and storing in a database) and authentication (a process of using the digital fingerprint of the hand to perform biometrics which are known processes that may be performed using digital fingerprints, and may even be control anonymous access to controlled areas or vehicle. The hand biometric system and method combines these processes with a particular set of hardware to perform the hand biometrics process that is novel and provides benefits and capabilities not achievable by other existing biometric systems and methods.

28 Claims, 6 Drawing Sheets

(58) Field of Classification Search
CPC .... G06K 9/2036; G06K 9/2063; G06K 9/209; G06K 9/00382
See application file for complete search history.

(56) References Cited

U.S. PATENT DOCUMENTS

| | | | |
|---|---|---|---|
| 4,677,435 A | 6/1987 | Causse et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,937,748 B1 * | 8/2005 | Schneider .......... G06K 9/00013 382/126 |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B1 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 8,959,029 B2 | 2/2015 | Jones et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,621,594 B2 | 4/2020 | Land et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |

(56) References Cited

U.S. PATENT DOCUMENTS

| | | |
|---|---|---|
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0165261 A1* | 7/2006 | Pira .................... G06K 9/00919 382/115 |
| 2006/0177104 A1 | 8/2006 | Prokoski |
| 2006/0253406 A1 | 11/2006 | Caillon |
| 2007/0056041 A1 | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0162734 A1 | 6/2016 | Ross et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0153069 A1 | 6/2017 | Huang et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | MacIntosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0039818 A1* | 2/2018 | Kim .................... G06K 9/0012 |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1 | 7/2019 | Withrow et al. |
| 2019/0287118 A1 | 9/2019 | Ross et al. |
| 2019/0342102 A1 | 11/2019 | Hao et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Shannon et al. |
| 2020/0334689 A1 | 10/2020 | Withrow |

(56) References Cited

U.S. PATENT DOCUMENTS

2020/0349379 A1 11/2020 Ross
2020/0356772 A1 11/2020 Withrow et al.

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3270342 A1 | 1/2018 |
| EP | 3435287 A2 | 1/2019 |
| EP | 3514715 A1 | 7/2019 |
| GB | 2097979 A | 11/1982 |
| GB | 2482127 A | 1/2012 |
| JP | 61234481 A | 10/1986 |
| JP | H07192112 | 7/1995 |
| JP | 2007213148 A | 8/2007 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2010018646 A1 | 2/2010 |
| WO | 2012145842 A1 | 11/2012 |
| WO | 2013051019 A1 | 4/2013 |
| WO | 2013126221 A1 | 8/2013 |
| WO | 2013173408 A1 | 11/2013 |
| WO | 2015004434 A1 | 1/2015 |
| WO | 2016081831 A1 | 5/2016 |

OTHER PUBLICATIONS

Bao et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Cavoukian et al. "Biometric Encryption: Technology for Strong Authentication, Security and Privacy," 2008, WE, Intl. Fed. lot Info Processing, vol. 261; Policies and Research in Identity Management; pp. 57-77.

Di Paola et al., "An Autonomous Mobile Robotic System for Surveillance of Indoor Environments," International Journal of Advanced Robotic Systems 7(1): 19-26, 2010.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Ebay, "eBay Launches Must-Have !Phone App Red Laser 3.0" published Nov. 18, 2011; https://www.ebayinc.com/stories/news/ebay-launches-must-have-iphone-app-redlaser-30/, downloaded Mar. 21, 2019, 7 pages).

Entropy.com Website History, Wayback Machine; https://web.archive.org/web/20160330060808/https://www.entrupy.com/; Mar. 30, 2016 (Year: 2016), 2 pages.

Extended European Search Report Application No. 21153877.2, dated Jun. 15, 2021, 8 pages.

Extended European Search Report, dated Jun. 18, 2021, for European Application No. 21153355.9, 8 pages.

Farid, "Digital Image Forensics", Dartmouth CS 89/189, Sprint 2013; 199 pages.

Fischler et al., "Random Sample Consensus: A Paradigm for Model Fitting with Applications to Image Analysis and Automated Cartography," Communication of the ACM 24(6); 381-395, 1981.

Huang et al., "A Novel Binarization Algorithm for Ballistic Imaging Systems," 3rd International Congress on Image and Signal Processing, Yantai, China, Oct. 16-18, 2010, pp. 1287-1291.

Huang, et al., "An Online Ballistics Imaging System for Firearm Identification"; 2nd International Conference on Signal Processing Systems, Dalian, China, Jul. 5-7, 2010, vol. 2, pp. 68-72.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Li, "Firearm Identification System Based on Ballistics Image Processing," Congress on Image and Signal Processing, School of Computer and Information Science, Faculty of Computing, Health and Science Edith Cowan University, Perth, Australia pp. 149-154.

Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.

Matsumoto et al., "Nano-artifact metrics based on random collapse of resist," Scientific Reports 4:6142, 2014 (5 pages).

Mistry et al., "Comparison of Feature Detection and Matching Approaches: SIFT and SURF," Global Research and Development Journal for Engineering, vol. 2, Issue 4, Mar. 2017, 8 pages.

Online NCOALink® Processing Acknowledgement Form (PAF) Released by Lorton Data, Jun. 2, 2009, URL=http://us.generation-nt.com/online-ncoalink-processingacknowledgement-form-paf-released-by-press-1567191.html, download date Jun. 25, 2010, 2 pages.

Rublee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Schwabe Williamson & Wyatt, PC—Listing of Related Cases; dated Sep. 16, 2017; 2 pages.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Shi et al., "Smart Cameras: Fundamentals and Classification," Chapter 2, Belbachir (ed.), Smart Cameras, Springer, New York, New York, USA 2010, pp. 19-34.

Shields, "How To Shop Savvy With Red Laser," published online on Mar. 22, 2010; https://iphone.appstomn.net/reviews/lifestyle/how-to-shop-sawy-with-redlaser/, downloaded Mar. 22, 2010, 8 pages).

Smith, "Fireball: A Forensic Ballistic Imaging System: Proceedings of the 31st Annual International Carnahan Conference on Security Technology," Canberra, Australia, Oct. 15-17, 1997, pp. 64-70.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

United States Postal Service, "NCOALink Systems", http://www.usps.com/ncsc/addressservices/moveupdate/changeaddress.htm, website accessed Jun. 23, 2010, 2 pages.

United States Postal Service, "Postal Addressing Standards," Publication Jul. 28, 2008, 55 pages.

(56) References Cited

OTHER PUBLICATIONS

United States Postal Services, NCOALink® Systems, dated May 27, 2009, URL=http://ribbs.usps.gov/ncoalink/ncoalink_print.htm, download date Jun. 23, 2010, 3 pages.

Veena et al., "Automatic Theft Security System (Smart Surveillance Camera)," Computer Science & Information Technology 3:75-87, 2013.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Farid, Ahmed, et al., "Integrated fingerprint verification method using a composite signature-based watermarking technique", Optical Engineering, The Catholic University of America, (Year: 2007), 6 pages.

Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.

Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.

Zaeri, Naser, "Minutiae-based Fingerprint Extraction and Recognition, 2020 (year 2010)", 47 pages.

\* cited by examiner

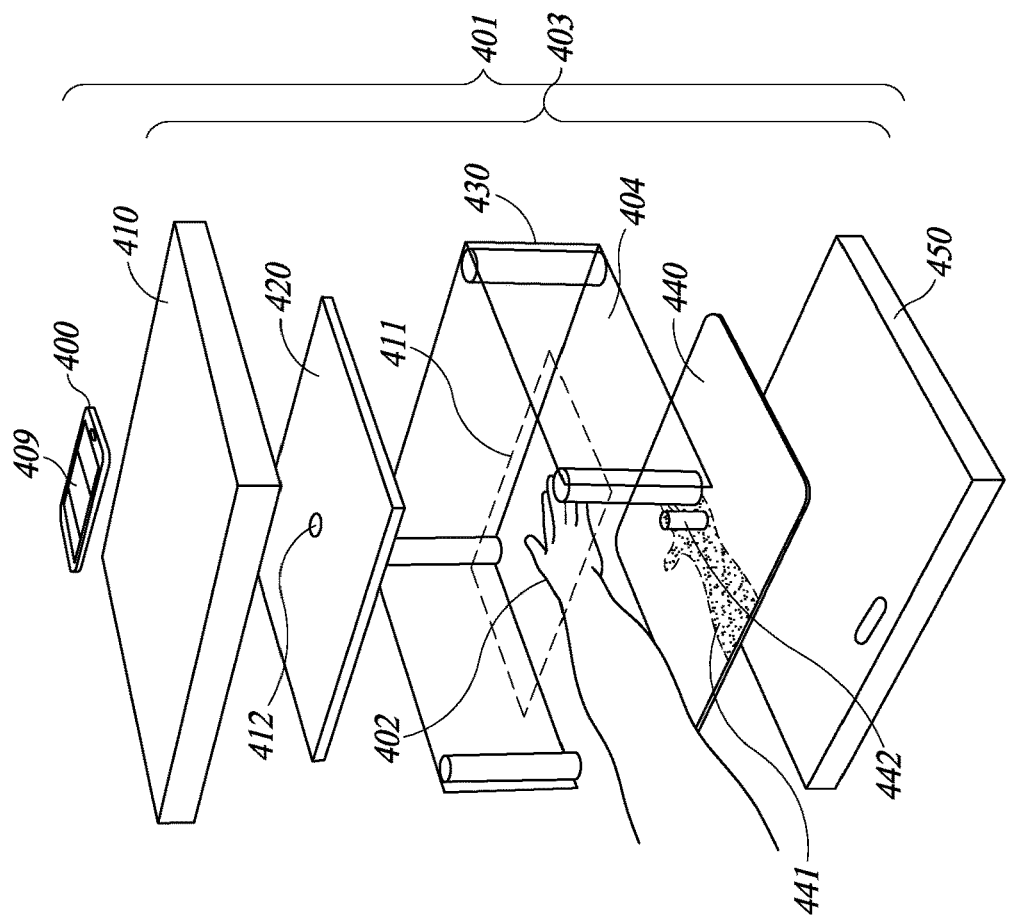
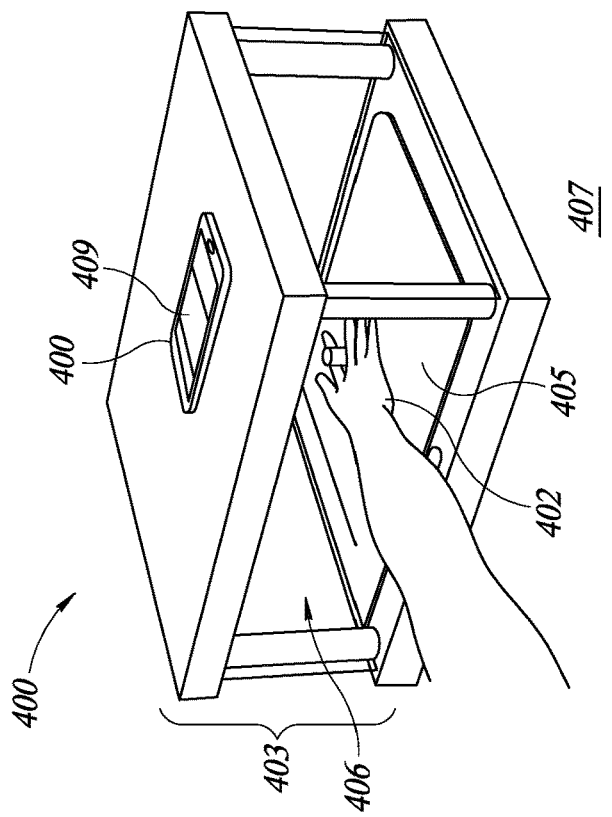
FIG. 4B
FIG. 4A

HAND BIOMETRICS SYSTEM AND METHOD USING DIGITAL FINGERPRINTS

RELATED APPLICATIONS

This application is related to U.S. application Ser. No. 16/045,642, "Model-Based Digital Fingerprinting" filed Jul. 25, 2018, which claims the benefit of U.S. Provisional Application No. 62/536,496, filed Jul. 25, 2017, and which is incorporated herein by reference. The application is related to U.S. application Ser. No. 16/681,698, "Contact and Non-Contact Image-Based Biometrics Using Physiological Elements" filed Nov. 12, 2019 and which is incorporated herein by reference. The application is related to U.S. Provisional Application No. 63/014,680, "Transform Pyramiding for Fingerprint Matching System and Method" filed Apr. 23, 2020, and which is incorporated herein by reference. The application is related to U.S. Provisional Application No. 63/015,441, "Hand Biometrics System And Method Using Digital Fingerprints" filed Apr. 24, 2020, and which is incorporated herein by reference. The application is related to U.S. Provisional Application No. 63/015,430, "Facial Biometrics System And Method Using Digital Fingerprints" filed Apr. 24, 2020, and which is incorporated herein by reference.

COPYRIGHT NOTICE

COPYRIGHT© 2018-2020 Alitheon, Inc. A portion of the disclosure of this document contains material which is subject to copyright protection. The copyright owner has no objection to the facsimile reproduction by anyone of the document or the disclosure, as it appears in the Patent and Trademark Office file or records, but otherwise reserves all copyright rights whatsoever. 37 C.F.R. § 1.71(d) (2017).

FIELD

The present disclosure relates to a biometrics system that uses the hand for biometrics and in particular to a hand biometrics system that uses digital fingerprints.

BACKGROUND

Many forms of biometric information may be used to identify people. Each current biometric approach is uniquely based on features appropriate to the particular area of the body used for identification. Thus, fingerprint identification only works on fingers, face recognition only works on features of the face, iris recognition only works on irises, and so on.

Among the most common forms of human biometrics are fingerprints, palm prints, and face recognition. Each of these techniques has associated technical and privacy concerns. For example, fingerprints and palm prints are limited technically because they require contact with a glass plate prior to collecting the information. The plate in these techniques is subject to getting dirty, thereby reducing the quality of incoming data and operational "up time," and physical human contact with the platen can contribute to the spread of sickness or disease-causing pathogens. Any assurances from those in the contact scanner industry that the "finger zone will be touched far less frequently than a restroom door" are not reassuring.

While face recognition systems do not suffer from the same limitations as fingerprint and palm print systems, it is known that face recognition systems require full-frontal images with reasonably high definition (e.g., 720 p, 1080 p). Not only do lower quality images and off-axis face angles cause problems, the need for substantial computing resources to store and process face images is also limiting. Furthermore, face recognition as it is commonly performed using facial images is worrisome from civil liberties, profiling, and privacy perspectives.

In addition, some forms of biometric information can be faked. For example, optical fingerprint methods can sometimes be fooled by model fingers inscribed with copied fingerprints. It would also be possible to detach the finger of a person and use the fingerprint on the detached finger in many fingerprint systems.

Thus, it is desirable to provide hand biometrics systems and methods that use digital fingerprints while overcoming the above technical problems, privacy concerns and spoofing that may occur with known systems and it is to this end that the disclosure is directed.

BRIEF DESCRIPTION OF THE DRAWINGS

FIG. 4A is an isometric view of a hand imager for authentication using hand biometrics, according to at least one illustrated implementation, illustrated with a human hand inserted into a portion of the hand imager;

FIG. 4B is an exploded view of the hand imager of FIG. 4A, illustrated with the human hand inserted into a portion of the hand imager;

DETAILED DESCRIPTION OF ONE OR MORE EMBODIMENTS

Figure 1:
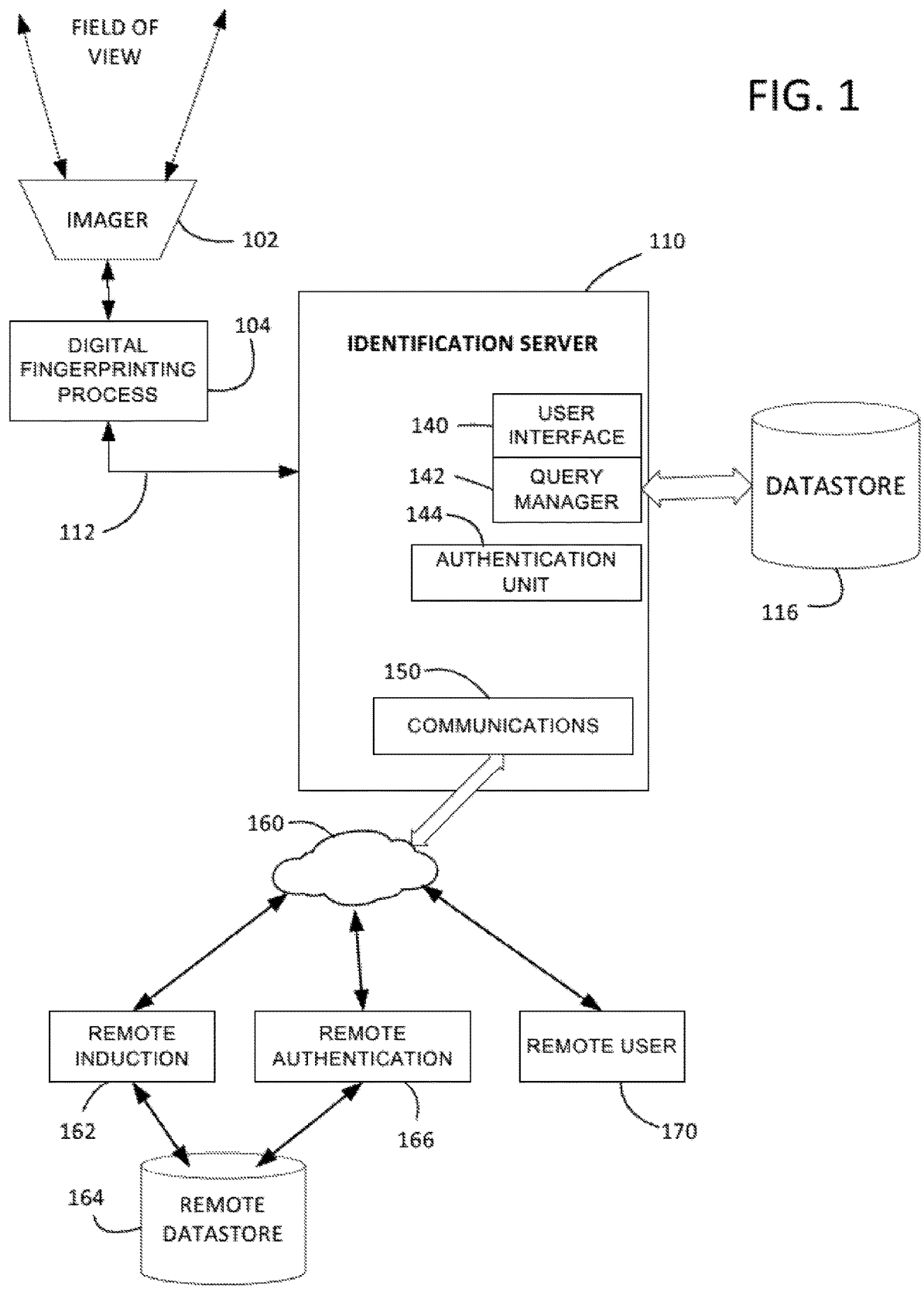
FIG. 1 is a schematic diagram illustrating an object authentication system that uses digital fingerprints, according to at least one illustrated implementation.

The disclosure is particularly applicable to biometrics systems and methods that use the digital fingerprints as generated by Alitheon, Inc. and as described in at least U.S. patent Ser. No. 16/045,642 and Ser. No. 16/681,698 and U.S. Provisional Application No. 63/014,680. It will be appreciated, however, that the hand biometric systems and methods have greater utility since such can be implemented using other known or yet to be developed digital fingerprinting systems. Furthermore, the hand biometrics systems and methods may be used for a security system at an airport or in a secured building or location. In the airport use case, the systems and methods may be used to identify and/or authenticate without identifying passenger(s) who are on premises at the airport, person(s) at the bag drop, at check-in, at security, entering the airplane and collecting baggage so that the system may be used to track the location of an individual during the time that the individual is at the airport. In addition, it may be possible to use the below described biometric systems and methods for a three dimensional part or other non-living product or object, such as a handbag, that can change between each acquisition of an image of the inanimate object/product.

The hand biometric systems and methods using the digital fingerprints may perform various digital fingerprint related processes including induction (acquiring of the hand data, generation of a digital fingerprint and storing in a database) and authentication (a process of using the digital fingerprint of the hand to perform biometrics). The hand biometric systems and methods combine these processes with a particular set of hardware to perform the hand biometrics process that is novel and provides benefits and capabilities not achievable by other existing biometric systems and methods.

At a high level, the hand biometrics system and method seeks to match a set of features (that form a digital fingerprint) extracted from one or more image(s) of a person's hand with features stored in a database and linked to various kinds of information. In one embodiment, the objective of the disclosed system is to accurately link a digital fingerprint taken of a person's hand with a file or program. That file or program may contain identification information, access and action permissions, or nearly anything else digital. Access permission may, for example, be provided based on authentication without identifying the individual.

The taught system is generally opt-in at induction, meaning that in most of the embodiments the individual is inducted by inserting a hand into a hand imager which captures one or more images of the hand. Later, authentication is achieved either with the person inserting the hand into a similar hand imager or by other means such as those discussed below. The taught system securely links a physical object—in this case a person's hand—with a digital object—in this case a file containing permissions to do something (such as enter a secure space or access a bank account), identification information, or other information that is supposed to be linked securely to the individual. We call this secure linkage "authentication". This current disclosure teaches the system for deriving and exploiting that secure link when the input data are representations of portions of human hands.

This disclosure has several parts. The disclosure starts with descriptions of exemplary hardware that may be used to capture the input from which features are extracted. The process of generating digital fingerprints from the captured inputs is then described, followed by the process of matching which may be used to authenticate individuals or other objects using the digital fingerprints. The features that facilitate the matching is then described. Finally, specific hardware for authentication using hand biometrics and the process of authentication using the hand biometrics are described.

FIG. 1 shows an object authentication system that uses digital fingerprints, according to at least one illustrated implementation. In the system, an object (not shown) may be placed into the field of view (indicated by the dashed lines) of the scanner or imager 102. The captured image or image data is processed by a process 104 to extract digital fingerprint(s) therefrom. Digital fingerprinting is described in more detail below. These elements may be discrete or integrated. For example, the scanner or imager 102 may be a camera in a smartphone, and the digital fingerprinting process may be an app on the same smartphone. Alternatively, intermediate data (for example, digital image data) may be transmitted over a network to a remote processor to generate one or more digital fingerprints from the image data. For example, a remote induction facility 162 may communicate over a network 160 with an identification server 110, or simply induct the object by storing generated digital fingerprints into a datastore 164 coupled to the induction facility. The induction facility may comprise, for example, a program or a programmed server as well as another imager 102.

The digital fingerprint of the object may be securely communicated to the server 110 via path 112 using known communications technology. The server 110 is coupled to (or includes) a datastore 116. The datastore may contain various databases and or tables, including, for example, records that store digital fingerprints. The server may implement, for example, a user interface 140, a query manager 142 for interaction with the datastore 116, and an authentication unit, process, and or application 144. One use of the authentication unit 144 may be to identify and/or authenticate an object (e.g., a human) based on an acquired digital fingerprint or the matching of two digital fingerprints of the object acquired at different time and under different conditions. To identify and/or authenticate an object (e.g., a human), the authentication unit 144 may acquire a digital fingerprint (from a local scanner 102 or remotely 162) and using the query manager 142, search the datastore 116 to find a matching (or best match) digital fingerprint record. In one aspect, it is this matching and/or authentication process that are improved using a transform pyramiding technique described in U.S. Provisional Application No. 63/014,680, "Transform Pyramiding for Fingerprint Matching System and Method" filed Apr. 23, 2020. The transform pyramiding technique may be performed by various combinations of the elements of the system in FIG. 1 and may be implemented as a plurality of lines of computer code or processor-executable instructions executed by one or more processors of an element in FIG. 1 or may be implemented in a piece of hardware that performs the operations/processes of the transform pyramiding technique.

In this illustrative example, the server 110 typically may also include a communications component 150. Various communications components 150 may be included to communicate for example, over a network 160 which may be local, wide area, internet, etc. Without limitation, communications components 150 may include any one or more of wired communications ports, wireless transmitters, wireless receivers, wireless transceivers, and/or radios. The data control server may implement record keeping and various other workflows.

All forms of capturing 2D, 3D surface, 3D depth (i.e., "inside"), and features that change during the acquisitions are in view of the present disclosure. One or more transforms, for example, similarity, affine, and homographic transforms of 2D images and or full projective transforms of 3D objects and surfaces may be used as part of a transform pyramiding technique, for example, the transform pyramiding technique described in Alitheon U.S. Provisional Application No. 63/014,680, "Transform Pyramiding for Fingerprint Matching System and Method" filed Apr. 23, 2020, to improve the matching described herein.

The capturing thus may include photon-based forms such as X-rays, tomography or image/video capture using a smartphone device camera, and also non-photon approaches such as ultrasound. In the simplified drawing of FIG. 1, the imager 102 may comprise any or all of these imaging technologies. The imager 102 may collect one or more still images and may assemble them into a video of the object.

Electromagnetic radiation in different frequency ranges can be used to gather both surface image information and shape information, which may individually or in combination contribute to the characterization of a point of interest. Different methods can be concurrently used for the two types of data. For example, an infrared depth camera can provide shape information, and a visual light camera can provide surface image characteristics. The shape information and surface image characteristics information can be combined into the digital fingerprint. The apparatus of this disclosure may use visible light, infrared (IR), ultraviolet (UV), and any other method of collecting surface image characteristics. Sound recorders may acquire sound characteristics of the object. The present disclosure covers the use of any method of gathering surface image and/or shape information, including stereo, focus stacking, structure from motion, pattern projection, time-of-flight, and Lidar. The present disclosure covers any method of collecting internal data, whether depth-based, projective, or of any other means, including X-Rays, tomography, and high-frequency microwaves. The present disclosure covers any one or combination of these methods of capturing, gathering, and collecting information, and any other like means of acquiring such information, whether effectively instantaneously or over a period of time. It also covers mixed mode acquisitions of data used to digitally fingerprint different characteristics of the object.

Figure 2A:
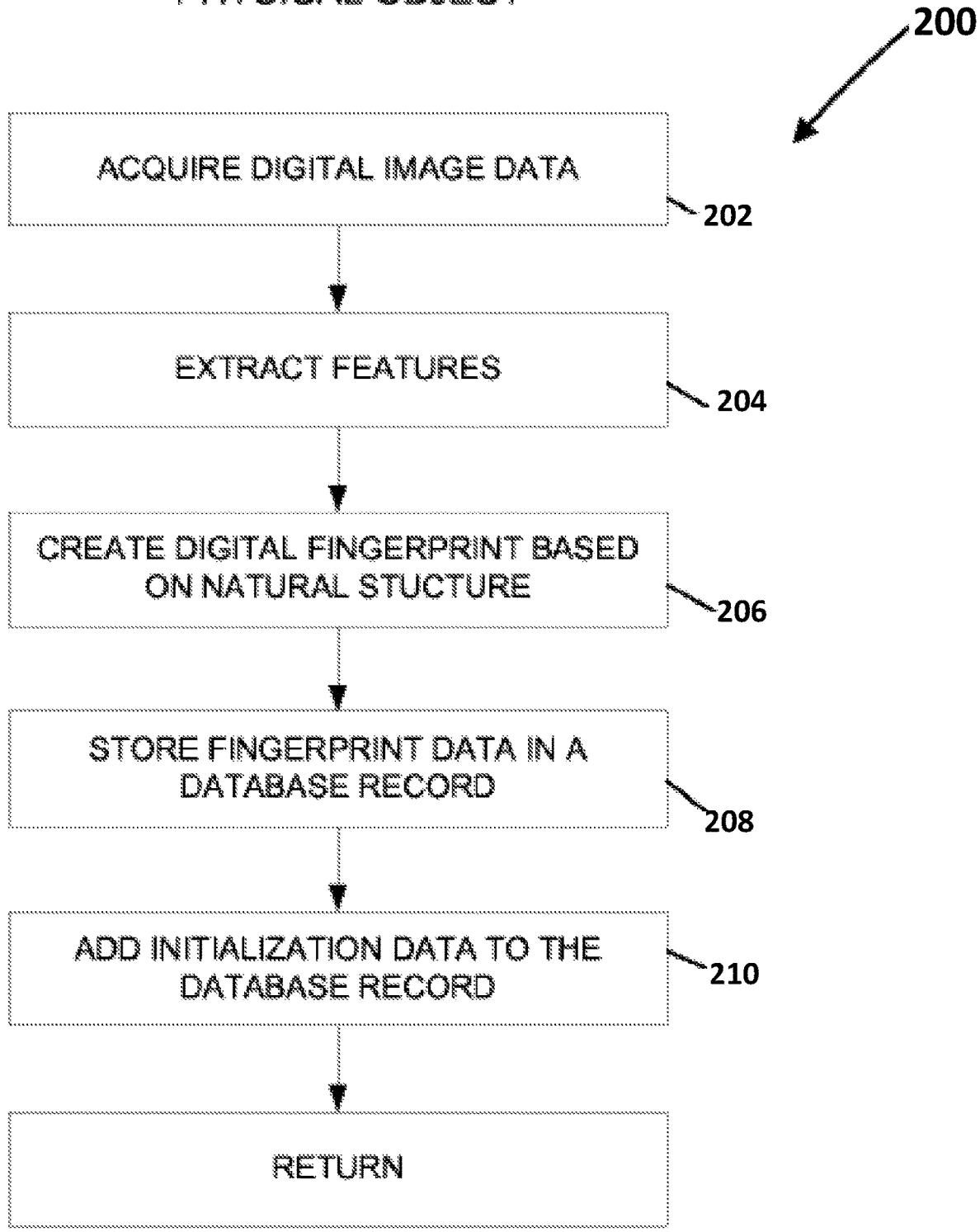
FIGS. 2A and 2B are flowcharts illustrating two methods for generating a digital fingerprint for an object, according to at least one illustrated implementation.

FIG. 2A shows a simplified method 200 for creating and storing or "registering" a digital fingerprint of an object (e.g., a portion of a human hand) in a datastore in form of a database, according to at least one illustrated implementation. The process, in one embodiment, includes acquiring a digital image of the object (e.g., a portion of a human hand), block 202, as discussed above. A variety of image capture technologies and devices may be used as noted. Next, features are extracted, block 204, from the digital image data. As explained, specific features or regions of interest (authentication regions) may be selected in support of subsequent identification or authentication of the object (e.g., a portion of a human hand). The extracted features are analyzed and feature vectors are extracted to form a digital fingerprint (i.e., a digital file or record) associated with the original image data, indicated at block 206. The digital fingerprint preferably may be stored in a database record at block 208. Other forms of searchable digital data storage should be deemed equivalents. Further, at block 210, initialization data may be added to the database record, or associated with the database record in a related table. This data is associated with the physical object that was scanned. The associated data may include a wide variety of data including, for example, a description, manufacturer, model number, serial number, content, and any other type of data that may be selected as appropriate or useful for a particular type of object. In some implementations, the initialization data may, for example, include access specifications which specify locations or areas of controlled access and/or days, dates and/or times, during which access is permitted on a controlled basis to an authorized individual. Additionally or alternatively, the initialization data may, for example, include access specifications which specify flights, trains, ships, and/or other vehicles that have controlled access and/or days, dates and/or times, during which access is permitted on a controlled basis to an authorized individual. Such the initialization data may further include access specifications for baggage, luggage or parcels, for example baggage, luggage or parcels that are authorized or carried by or otherwise belong to authorized individuals. In at least some implementations, the digital fingerprint for an individual may be anonymized, having no the initialization data that would identify the individual from which the digital fingerprint was generated. The system would be able to subsequently authenticate that individual (e.g., determine that a sample digital fingerprint from that individual matches within some level of tolerance a reference digital fingerprint from that individual) without having to establish the actual identity (e.g., given and surname) of the individual, and could grant access to restricted areas or vehicles based on the anonymized authentication.

Figure 2B:
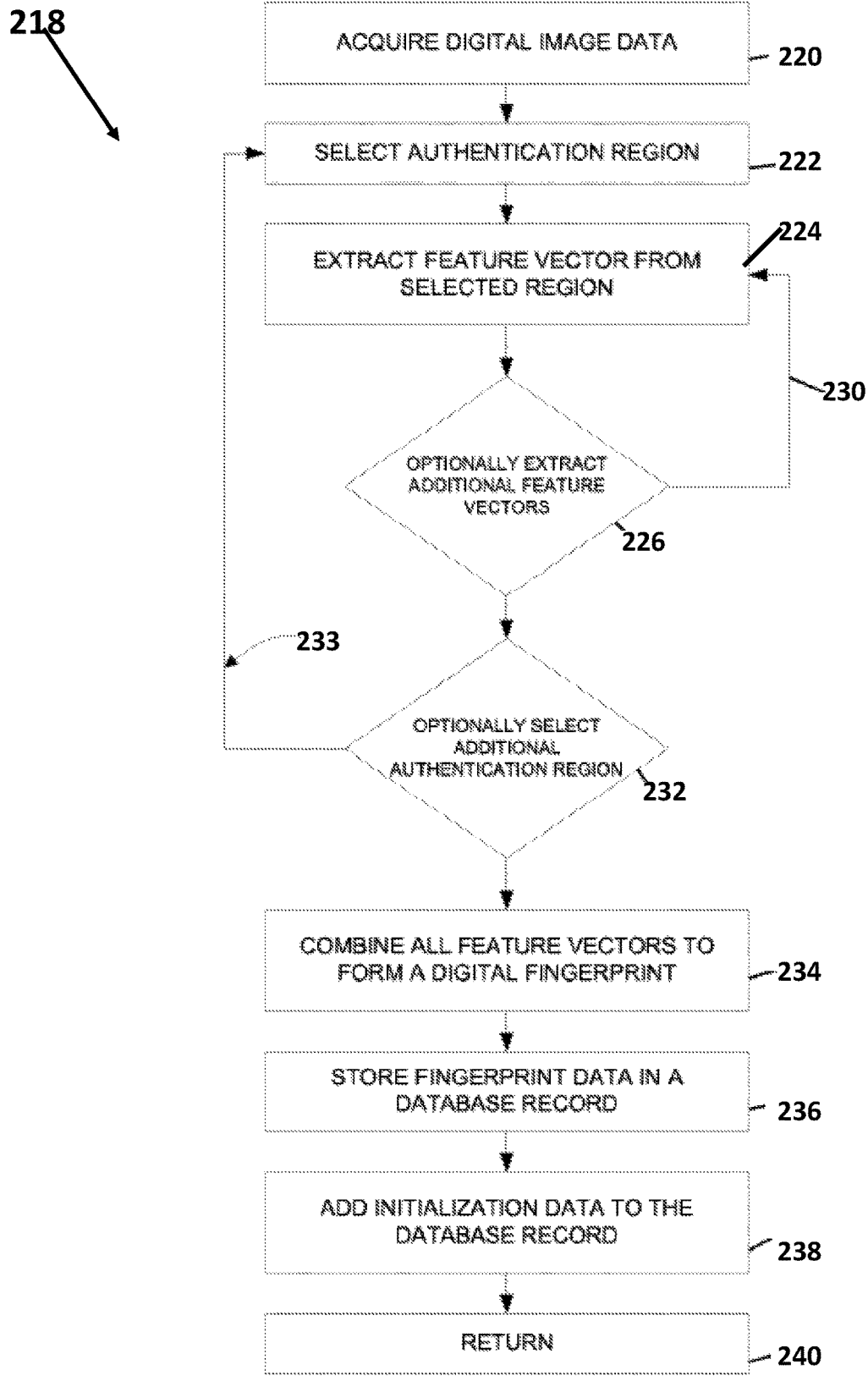

FIG. 2B illustrates a process 218 that includes more robust feature extraction than that illustrated in FIG. 2A, according to at least one illustrated implementation. In this example, the process 218 again begins with acquiring digital image data, block 220. The system selects at least one authentication region, block 222. This may be done by analysis of the image data, analysis of related image data, by reference to a predetermined template that defines at least one authentication region, or other image processing techniques. The system then extracts a feature vector from the selected authentication region, block 224. A feature vector may be used to represent features of a region in a more compact form. For example, a feature vector may comprise an array of color or gray scale numeric values corresponding to areas within the selected authentication region. The values may each comprise a sum, average, maximum or other function of the individual values of a corresponding group of pixels forming a sub-part of the region. In some applications, a feature vector may identify a location and shape of a distinctive aspect within a selected region. The system determines, decision 226, if there are additional feature vectors to be extracted from the same image data. If there are additional feature vectors to be extracted, the control returns, path 230, to repeat the feature extraction, block 224. This loop may repeat until all desired feature vectors are collected. Optionally, the system may determine if there is another authentication region to process in the same image data, see decision 232. If there is another authentication region to process, control is traversed back to block 222 via outer loop 233, for further feature extraction with respect to one or more additional authentication regions.

The system may combine some or all of the extracted feature vectors to form a digital fingerprint, block 234, which the system may then cause to be stored, block 236, along with or logically associated with related data, block 238, as mentioned above. The process returns or concludes at block 240. Note that the process shown in FIG. 2B may be performed using mixed-mode acquisitions, wherein the mixed-mode acquisitions may include, for example, acquiring a video of a face of a person as the person says a password, and acquiring a sonogram of the person's voice as the person says the password, and making a single digital fingerprint using all of the data from different data acquisition modes. Similarly, images may be captured as an individual moves a hand through a defined set of motions or gestures.

Figure 3:
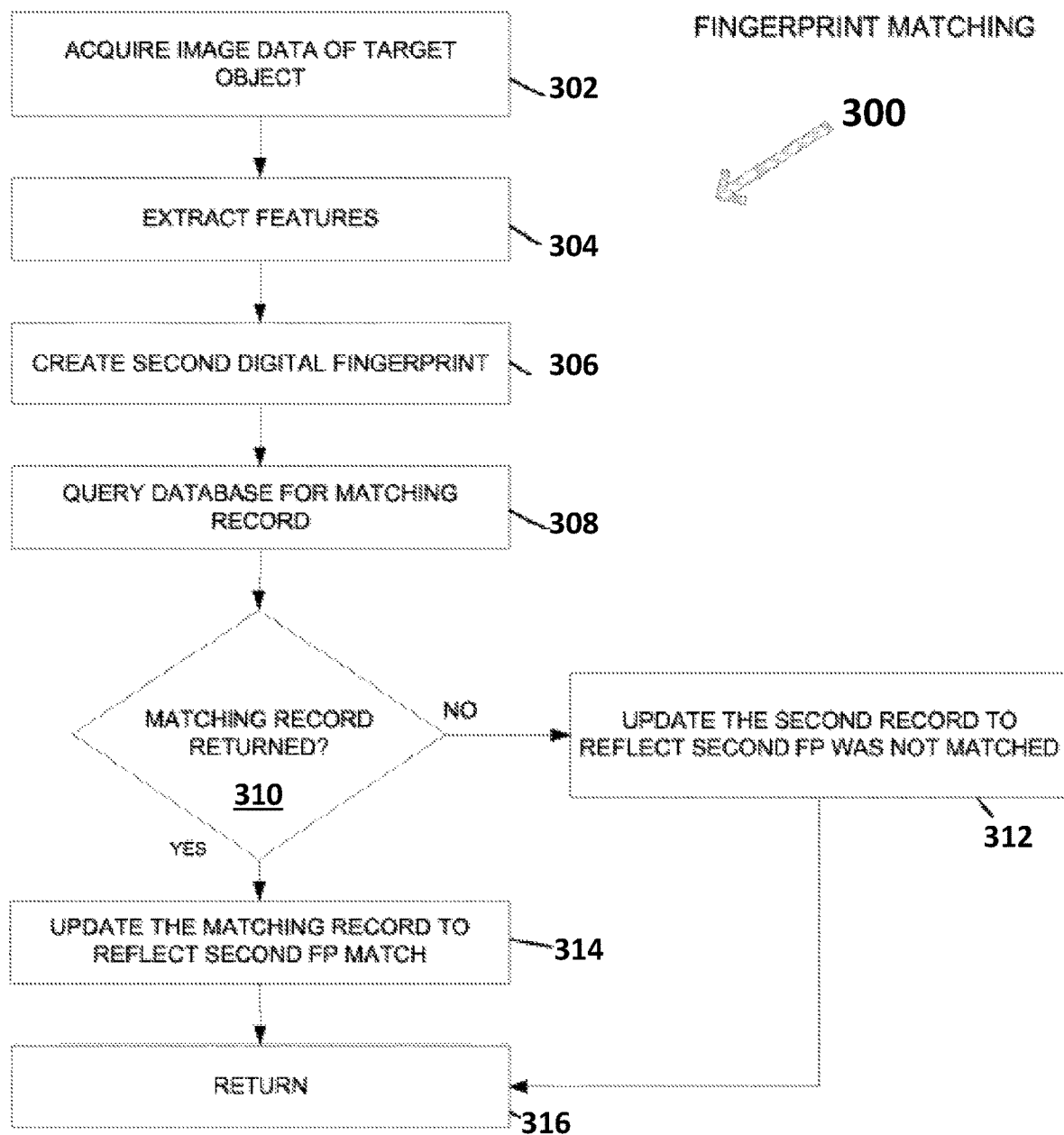
FIG. 3 is a flowchart illustrating a method for matching digital fingerprints, according to at least one illustrated implementation.

FIG. 3 shows a simplified method 300 for matching a digital fingerprint of a target object to a database of existing or "reference" digital fingerprints, according to at least one illustrated implementation. Here, the system acquires images or image data of a "target object" i.e., the individual (e.g., portion of human hand) or other object to be identified and/or authenticated by finding a match in the database, see block 302. The system extracts features from the target object image data, block 304, as discussed above. The system then creates a new (second) digital fingerprint based on the extracted features, block 306. The system then queries the dataset, for example a database, block 308, for a match, for instance for a record that matches the second digital fingerprint record. "Matching" in this context may be relative to a threshold confidence level rather than a binary decision or to a match confidence level with some other object (e.g., determine that an object is legitimate or authentic when the digital fingerprint for the object matches within a defined tolerance or threshold a digital fingerprint of the reference object (legitimate object). A sample digital fingerprint matching a given reference digital fingerprint may, for example, include sample digital fingerprint matching the given reference digital fingerprint better (e.g., an object that is considerably better) than the sample digital fingerprint matches the reference digital fingerprints of any other object in the dataset). The requisite confidence level may vary depending on the specific application. The confidence level required may be varied dynamically responsive to the data and experience with a given system. If no "matching" record is returned, decision 310, the second record (the digital fingerprint of the target object) may be updated, block 312, to reflect that no match was found. If a match is returned, the matching record may be updated to reflect the match, block 314 (for example, it may be linked to the second record). The results may be returned to the user. The process returns or concludes at block 316. Since each digital fingerprint is complex and the matching process is also computationally intensive, these processes and the overall method 300 in FIG. 3 cannot be performed by a human being nor can these processes and the overall method 300 be performed using pen and paper by a human being. Thus, the method 300 shown in FIG. 3 is a technical process.

As mentioned earlier, a "scan" may refer to an image (or digital data that defines an image) captured by a scanner, a camera, a specially-adapted sensor array such as CCD array, a microscope, a smart phone camera, a video camera, an x-ray machine, or any other device or image sensor that can sense and capture electromagnetic radiation (or any identifying information, e.g., sonar etc., that has traveled through an object, or reflected off of an object, is a candidate to create a "scan" of the object). It is critical to capture at least one native feature of the object, which may be of an original region of the object as distinguished from a region having a feature added to the object for identification, such as a label, bar code, RFID tag, serial number, etc. In some cases, the native feature may of a non-original region in which an object has been added to the physical object for identification (such as a label). The added object may be affixed (e.g., permanently affixed) to the physical object, such as through an adhesive in the case of a label. So long as the added object (e.g., the label) becomes an integral part of the physical object, the system can scan or image the added object to obtain a digital fingerprint and use that digital fingerprint to track the physical object. In some embodiments, the digital fingerprint corresponds to an original region, a non-original region (corresponding to where an object has been added for the purpose of, for instance, identification of the physical object), or combinations thereof.

A "native feature" in this description may not be concerned with reading or recognizing meaningful content, even in the case where the digital fingerprint corresponds to a non-original region. For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to or be inherent in the printed serial number on the label (e.g., differences in the way a particular character is printed from object to object), but there is no effort to actually "read" or recognize the printed serial number (which may not be legitimate). In other implementations, this inherent information is used in addition to information represented by the printed serial number. Similarly, an RFID tag applied to an object may give rise to a fingerprint vector responsive to its appearance and location on the object. However, in some examples no effort is made to actually stimulate or "read" data or signals from the tag. In some embodiments the system is not using the added object according to the tracking scheme from which it originated. The various features used in fingerprint processing, some or all of which may become part of a digital fingerprint set or vector that is associated with the physical object, may be extracted from a permanently affixed label (for the purposes presented here the contents of the label, e.g., the value of the serial number may be irrelevant).

As mentioned above, the at least two digital fingerprints of an object that are being matched as shown in FIG. 3 may have been acquired under different conditions which can result in the match failing or taking a longer time than is desirable or permitted for a particular use case. As mentioned above, the disclosed method may incorporate one or more transform pyramiding techniques to improve the above technical digital fingerprint matching process.

The Hardware

FIG. 4 shows a hand imager 401, according to at least one illustrated implementation, with a portion of an arm and in particular a human hand 402 positioned with respect to hand imager 401 to be imaged thereby. The illustration is not to scale and is meant solely to represent some of the components of an exemplary hand imager 401. A production system would likely be quite different in appearance.

Hand Imager

FIGS. 4A and 4B show an exemplary hand imager 401 for hand biometrics authentication. As shown in the drawings, the hand imager 401 includes a structure 403 (e.g., an imaging box) having at least one wall 404 that at least partially encloses an interior 405 of the structure 403. The at least one wall 404 has an opening 406 that is sized and shaped to removably receive a human hand 402 therethrough when inserted into the interior 405 of the structure 403 from an exterior 407 of the structure 403. The hand imager 401 also includes at least one image sensor 409 with a field-of-view 411 (illustrated by broken-line box) that is oriented to encompass at least a portion of the human hand 402 when the human hand 402 is inserted into the interior 405 of the structure 403. The at least one image sensor 409 is operable to capture one or more images of at least the portion of the human hand 402 while the human hand 402 is in the interior 405 of the structure 403.

The hand imager 401 may include a plurality of integrated components.

Included in the hand imager may, for example, be one or more cameras 400 (one shown) including the at least one image sensor 409 and optionally hardware (e.g., processors including microprocessors, central processing units (CPUs), graphical processing units (GPUs), digital signal processing units (DSPs), neural processing units (NPUs), and/or registers, for instance formed as a system on chip (SOC), or formed individually; and/or including field programmable gate arrays (FPGAs) or application specific integrated circuits (ASICs); nontransitory storage media including nonvolatile memory, for instance read only memory (ROM), volatile memory, for instance random access memory (RAM), Flash memory or solid state drives (SSDs), and/or spinning media, for instance magnetic disk drives or optical disk drives which store processor-executable instructions (e.g., software) operable to capture images and extract features from those captured images and generate digital fingerprints based on the extracted features. The camera 400 may be integrated into a top portion 410 of the structure 403 (e.g., imaging box).

The hand imager 401 may include at least one light source. For example, the hand imager 401 may include a lighting panel 420. The lighting panel 420 may advantageously extend across the dimensions (e.g., laterally in two dimensions, namely length and width) of the interior 405 of the structure 403 to provide a balanced light field to the human hand 402 when the human hand 402 is within the interior 405 of the structure 403. The lighting panel 420 may, for example, be integrated into an interior surface of the top portion 410 of the structure 403. The lighting panel 420 may include a through-hole 412 to accommodate the camera 400. In some implementations, the camera 400 or a portion thereof may extend through the through-hole 412 to capture image data of human hands 402 placed inside the structure 403 (e.g., imaging box). In other implementations, the camera 400 or a portion thereof may be aligned such that a field-of-view of the camera 400 extends through the through-hole 412 to capture image data of human hands 402 placed inside the structure 403 (e.g., imaging box). The lighting panel 420 may maximize even diffuse lighting coverage by providing a balanced light-field with as few gaps in the coverage as possible.

As alluded to above, the structure 403 may take the form of an imaging box, and may include a frame, the at least one wall 404 comprising three side walls 430 partially enclosing the interior 405. The side walls 430 may be translucent, allowing visual perception of the interior 405 of the structure 403 while substantially reducing the passage of at least one range of wavelengths of light into the interior 405 of the structure 403 from the exterior 407 thereof. For example, the side walls 430 may comprise smoked panels (e.g., smoked Plexiglas panels) for light isolation without complete visual obfuscation. One or more support columns of the frame maybe integrated into one or more of the side walls 430. Incoming light from the environment in which the structure 403 is operating can result in variable lighting or hotspots within the image, reducing our ability to recognize features in certain locations. Three sided walls 430 of smoked Plexiglas may be installed around the interior 405 in order to reduce the magnitude of incoming light without completely obfuscating the contents of the structure 403 from those nearby.

The structure 403 may include an insertion tray 440 with camera-to-hand registry 441 and alignment post 442. The insertion tray 440 may, for example, form a bottom interior surface of the structure 403 (e.g., imaging box). The insertion tray 440 may be modular and may detach from the remainder of the structure 403. Physical registration may be added to the structure 403 by way of the insertion tray 440 having one or more vertical alignment posts 442 (only one shown) which situates between pairs of digits (e.g., the middle and ring finger) of the human hand 202 of a subject. Additionally or alternatively, the insertion tray 440 may include a depression approximating a profile of a palm and five digits of the human hand. This alignment guide standardizes the position of a human hand 402 when inserted into the interior 405 of the structure 403 during image capture to homogenize image quality for varying shapes and sizes of human hands 402. The modular insertion tray 440 may be integrated into the interior side of the bottom portion 450 of the structure 403.

The at least one image sensor 409 of the hand imager 401 may be positioned and oriented to capture images a back of the human hand 402 when the human hand is inserted into the interior of the structure 403. Such may be preferred primarily because palm prints and fingerprints are common ways to identify an individual from their hand, but the back of the hand is not typically used for identification purposes. Thus, such may allow anonymous authentication of an individual, while protecting privacy. Applicant notes that various other embodiments of the hand imager 401 may be operable to capture the front, back, sides, or any combination of hand surfaces.

In order to induct and subsequently authenticate an individual, the subject inserts their hand 402 into the interior of the structure 403. The subject is instructed to hold their hand 402 flat against the modular insertion tray 440 with the vertical alignment post 442 resting in between their middle and ring fingers. Focus of the at least one image sensor 409 is set to the back of the hand 402 such that the depth-of-field yields the maximum coverage of the back of the hand 402 in proper focus. This image is the inducted into either local memory or secure cloud storage where the feature extraction algorithms can create a digital fingerprint of the image to add to the dataset (e.g., database) of digital fingerprints for inducted hands. When the subject is authenticated, the subject runs through the same process for image capture, except after the image is transferred either to local memory or secure cloud storage, the resulting digital fingerprint is compared against the dataset (e.g., database) of digital fingerprints of inducted hands, where feature matching algorithms can quantify or discern the authenticity of the incoming authentication or sample image.

In most embodiments of this system there is a single camera taking a single image. The goal with a single camera is to get as good an image as possible on the entire object. A good image is one that works with the point of interest detection and characterization algorithms to provide reproducible point of interests. This, in turn, means that as much as possible of the hand should be in focus, that the areas that are out of focus should be as similar as possible from acquisition to acquisition, and that the point of interest location and characterization algorithms should be focus-insensitive.

Single-camera/single-image capture will, in general, not use depth information since blur-based depth information is both unreliable, and where HORUS is used for point of interest location and characterization, compensated for by HORUS. HORUS accomplishes near focus invariance by sacrificing scale invariance, which may be superfluous where the positioning of hand and image sensor(s) (e.g., camera) are controlled. The nature of the rig means that the hand is at more or less the same distance from the image sensor(s) (e.g., camera) in each image capture, and hence concerns about scale are vastly less important compared with multiple camera/multiple image capture systems. Consistency in construction and in particular dimensions between different instances of the hand imager 401 will help to ensure such.

In some embodiments multiple single-camera images can be taken rapidly with different focal planes and the images combined. Combining images with different focal planes has two principal advantages. First, it enables significant depth information to be gathered about the object (e.g., human hand), with each focal plane being treated as depth information on the object, to produce a stepped version of the image, and then the resulting stepped version of the image may be smoothed. Although not nearly as accurate for determining pixel-by-pixel depth information as that provided via stereo or depth cameras, such an approach does provide useful depth information.

A more significant reason for capturing focus stacked information is that the focus stacked information creates an image where nearly all the visible surface of the hand is in focus, leading to better point of interest detection, location, and characterization (even with relatively focus-insensitive algorithms like HORUS).

Points of Interest

Points of interest are positions on (or within, though not for this disclosure) the object where "something interesting" is happening and that can be reliably found again on multiple acquisitions of the object. In other words, points of interest are preferably locatable and repeatable. the points of interest should be repeatable so it is possible to link two acquisitions of the same object through the points of interest. The points of interest should be locatable (e.g., a point at a corner vs a point on a line, with the former being locatable and the latter not) so that it is possible to know that the points of interest that are being linked in fact corresponding points of interest in two or more different acquisitions.

Points of interest are used for two different purposes. They are used to link images from different cameras taken at the same acquisition into a stereo view, and they are used to match two different acquisitions of the same object. One characteristic of a point of interest, clearly seen in both these uses, is that the points of interest can be unambiguously located in multiple views of the same object and that, having been so located, the points of interest can be distinguished from other points of interest reliably. Reliably here means either in its characterization (i.e., it simply looks different from others) or in location (i.e., it is in the right spot geometrically relative to other points of interest so that the pattern of such points of interest is duplicated in another view of the same object—whether for stereo matching or for authentication matching—or both).

The above discusses finding places on the object that have a high likelihood of being replicated in other acquisitions of the object. It is also important to assign globally-relevant location information for the points of interest that are found. As described herein, "globally-relevant" means measured with respect to a coordinate system external to any particular image of the object. The exact external coordinate system used is not particularly relevant, though one exemplary coordinate system that may be used includes a coordinate system having three axes including the camera-object line, vertical, and horizontal to the right (from the camera's viewpoint).

Once the coordinate system is defined, each point on the individual images of the object may be mapped from the local on-image two-coordinate system to the global three-coordinate system. There are many ways to perform the mapping. Generally, mapping techniques consist of finding points of interest shared among the overlapping image pieces and determining from their position in the images (local 2D coordinates), and possibly knowledge of the geometry of the camera-object system, the global coordinates in three-space for the points of interest. The point of interest detection, characterization, and matching capabilities discussed elsewhere in this description provide a good set of such points of interest. The location in the global coordinate system for each point should be known as accurately as possible since, many features of the object will be derived from them.

Repeatability

These localizable points of interest would be of no value for aligning or matching images were they not to appear in multiple images of the object. In other words, the desired points of interest should be repeatable. Repeatability and localizability are useful characteristics for both matching images taken of the object at the same time and matching images taken at different acquisitions. To be repeatable, a point of interest should have very similar feature vectors across images and acquisitions and, in most embodiments, also appear (up to some allowed transform) in the same place across images and acquisitions. This should be true even in the presence of considerably different acquisition conditions. Repeatability often requires normalizing out changes likely to occur, such as absolute illumination, blur, scale, angle of view, and distortions in the object itself.

Many of the benefits of the teachings of this disclosure are achieved by the system as a whole and are not necessarily achievable by any part of the system alone. In particular, how the system handles variation in illumination. Experience teaches that neither the hardware nor the software alone is sufficient to achieve useful illumination insensitivity, but both together work well. The hardware plays its part by providing uniform illumination so that the features on the surface of the object appear as nearly the same as possible. However, the alone may in some instances be insufficient—some parts of the system may capture their images using ambient light—but it does help. It helps not only in controlling for the level of illumination but also in its variation across the object—such as the lights, camera, and object at induction being carefully placed to avoid shadows—something hard to do while imaging changeable three-dimensional objects.

Attempting uniform and diffuse illumination in some instances may not be sufficient. First, on a moving, changeable three-dimensional object, perfectly uniform illumination is very difficult to achieve in a single acquisition and nearly impossible across two acquisitions separated by time and/or by acquisition hardware. Second, in systems where there can be significant asymmetries in acquisition conditions, such high-quality illumination may be nearly impossible. A 2D acquisition accomplished with ambient fluorescent light can look very different from one accomplished with controlled LED lights synchronized to reflectance sensors, for example. As a result, the extraction algorithms that determine the characteristics (and hence the feature vector) of points of interest normalize out variations in illumination that take place over scales larger than the (generally very small) regions from which a point of interest comes. In some implementations, combining improvements in hardware and improvements in processing (e.g., software) may realize synergistic improvements not otherwise obtainable by either hardware alone nor software alone.

Another illumination-centric function that may advantageously be employed in multiple camera and or multiple image capture systems is how images are merged when creating a model of the human hand from which features will be extracted and digital fingerprints generated. Hands do not show purely diffuse (Lambertian) reflection, therefore, images of the same part of the hand taken by cameras in different positions or orientations (e.g., having different points of view) may show substantially different light levels even under the same uniform illumination. In order to cover the model with an image, the system can merge these overlapped images to form a single image from which the points of interest are extracted. There are many ways to perform such, although taking pixel-by-pixel average or median proves to be quite effective. Even better results may be obtained by weighting each pixel by its distance from an edge of the field of view. This avoids artifacts (and hence spurious points of interest) at the edges of the regions seen by a particular camera.

Another way the taught system normalizes out changes in illumination is to make the feature vectors of the points of interest insensitive to absolute illumination. For example, features such as binary gradients may advantageously be employed to achieve such absolute illumination insensitivity.

Localizability

A characteristic for a good point of interest is that the location of the point of interest on the image or model is not ambiguous, and that its coordinates can be determined to within a small tolerance. This should be true on both acquisitions (i.e., the one in the reference set and the one the sample set being tested or on both images being aligned from a single acquisition).

Point of interest localizability is useful for two reasons. First, matching two points provides useful information that indicates that the two objects are difference appearances of the same object if it can be ascertained that the two points are from a same location on the object. Second, in some embodiments (but not all) after points of interest are filtered, for instance by measuring the vector differences between their feature vectors, additional winnowing may be performed by requiring sets of points from the same local area have, up to an allowed transform, the same geometric relationship in the two acquisitions.

Well-defined positions of similarly-featured points of interest are valuable for the geometric matching (i.e., determining the transform between the two acquisitions and matching in the presence of such distortions). Being able to localize the points of interest helps geometric matching, but the geometric matching also limits the possible locations of matching points of interest to what is physically realizable. In other words, whatever transform whose parameters are found should be a physically possible transform.

Ensuring that matching points of interest are from the same location (up to the allowed transformations in object shape, viewpoint, and so on) on the object is particularly complicated because the possible locations of the point pairs are dependent on the transformation and the parameters of the transformation, while at the same time, the transformation and its parameters are determined by matching point pairs. This means that whatever points of interest form the match pair set, the two sets must differ by a physically-possible set of transform parameters. Though complex, this two-pronged approach helps guarantee that we have found the correct points and the correct transform. Both RANSAC (or equivalent) and limitations on transform type and parameters simultaneously ensure we have correctly localized both members of each true match pair and that those pairs determine a realistic transform. Where geometric matching is used, this provides another example of the different parts (in this case two algorithmic parts) of the taught system working together to produce better results than either produce alone. At least some suitable techniques and algorithms are described in U.S. Provisional Application No. 63/014,680.

The property of localization with respect to different features is useful, and may be analyzed from several perspectives. The easiest is in the luminance of the surface. For simplicity, monochrome images are used as an example below, but it should be noted that the different color planes can each provide such localization. Consider a white spot on a black background. In all directions from the center, the image gets darker. Provided the spot is of a scale the point of interest detector can find, there is no question where the spot is located. Now consider a corner such as where two perpendicular line segments end. Although the image is uniform within the line segments and also uniform (but of a different value) outside them, the corner is still easily localizable because in most directions there is a sudden change in value at the corner.

Points on lines or on curves of radius much larger than the characterized region typically cannot be localized because there is no comparable change in value along the line or curve. One point on such a line or curve looks much like any other and so is not a good candidate for a match pair. Similarly points within uniform regions of the image are not typically localizable since there is little or no change in any direction.

There are many ways to find localizable points of interest. A practical and commonly used one is to take the Laplacian of the image values and filter the image by locations where the absolute value of the Laplacian is both large and substantially larger than at neighboring locations. A different but related approach to the Laplacian is to calculate the Hessian matrix at every point. The Hessian is the matrix of the second derivatives of the function. Once the Hessian has been calculated, candidate points are where the determinant of the Hessian is large in absolute value (and larger than elsewhere in the neighborhood). The eigenvalues of the function are then found at such candidate points. If the eigenvalues have the same sign, are of roughly the same magnitude, and if that magnitude is large enough, they mark places where the "curvature" of the image function is substantial and falls off in all directions.

Points of interest can be found using features other than from monochrome images. Of course, it is not merely monochrome image pixel values that can be used to determine localizable points of interest. A red spot on a green background where both colors have the same luminance (and hence the spot doesn't show up in a monochrome image) is a trivial example, but all the features characterized in a point of interest feature vector are candidates, either individually or working together.

Features Extracted

The section discusses various features useful in performing biometrics. In particular, this section describes how features that are used to characterize the points on interest are found using the process described above. The specific features that go into the feature vectors of the points of interest so that match pairs can be determined are also described. In exemplary embodiments using hand biometrics features may include image based features for single and multi-image capture system and as well as depth based features (e.g., depth coordinate and surface normal direction) for multi-image capture systems including focus staking with depth approximation.

Characterizing Points of Interest in Each 2D Image

The scale and or size of a point of interest is estimated via scale space analysis of response values of various image operators. Image operators include but are not limited to point operators such as Laplacian and Hessian operators, image region operators such as Harris and other moment operators, corner detection operators, and image convolution operators, custom or otherwise. The "size" of a point of interest (i.e., that which ultimately defines the total region of the image surrounding the point of interest to be used in characterization and orientation estimation) is computed by applying a multiplicative factor to the point of interest scale. Said multiplicative factor is optimally trained to produce the highest degree of accuracy/discrimination in point of interest matching.

Orientation of the point of interest can be computed from the directional intensity gradients calculated at regularly sampled points within a region surrounding the point of interest; point gradients may be weighted by distance from the point of interest, averaged and/or binned for the final orientation estimate. Orientation may also be computed from intensity gradients across multiple distinct point pairs within a region surrounding the point of interest by accumulating the gradient-weighted sum of between-point angles. In another implementation, orientation may be estimated based on analysis of moments of image intensity or intensity gradient in a region surrounding the point of interest. Many other techniques may be employed.

As mentioned above, feature characteristics are extracted from a region surrounding the point of interest defined by an estimated size of the feature. Characterization may, for example, be based on image point intensities, image sub-region intensities, image intensity point gradients, and image intensity region gradients. Multiple methods of creating binary features and optimally selecting the subset to be used in characterization are employed.

Point of Interest Location

In at least one implementation, a system captures one or more high-resolution views of at least a portion of a human hand. The digital fingerprints that result from such images can determined separately and used for individual image matching (2D vs 2D and some forms of 2D vs 3D) as described below. When the points of interest appear in multiple images, however, those points of interest can also be used to determine the locations of those points of interest in the global (3-space) coordinate system using various multi-camera stereo matching techniques. These points of interest, positioned now in three dimensions, form the skeleton of a model of the object (e.g., back of human hand) that is being built. Now, two additional operations may be performed. First, using interpolation, spline fitting, or other such means, the system (e.g., one or more processors) can determine the coordinates of each pixel on the entire visible (by enough cameras) surface. Second, the system (e.g., one or more processors) can merge the images at each point to give a uniform and, so far as is possible, artifact-free image of the entire surface. When complete, each point on the model has assigned to it a set of color values and three positional coordinates. In addition (see to U.S. application Ser. No. 16/045,642), the system (e.g., one or more processors) may determine additional features of the model (such as the angular distribution of non-Lambertian reflectance vectors).

The set of points of interest found may not be optimal for characterizing the object. Among other things, the point of interest characterizations were derived prior to cleaning up the image and without regard to such things as angle of view. The following sections describe how to improve the point of interest set.

Characterizing points of interest on the surface of the model. Several improvements in the point of interest set found above can be made now that a model of the object exists that has a smooth image applied to its surface and whose pixel coordinates are now known. In multi-image capture systems a plurality of high-resolution images may be used to determine the 3D coordinates and to create the reduced artifact image so that the approaches described in this and following sections work with high accuracy. This is another way the hardware is designed with the software in mind and the software synergistically takes advantage of what the hardware can do. The following sections discuss this characterization.

Averaging characterizations. In at least one implementation, the system simply averages or takes the median of the characterizations of the each point of interest that was used to align the images into the stereo view of the object. This approach will provide pretty good results since the points of interest in the original images were close enough to allow matching.

Depth and surface normal approximation from focus stacked images. Focus stacking was mentioned briefly above. This section explores it in somewhat more detail. Focus stacking is the process of taking a sequence of photos with incremental focus differences until the system has both the closest point on the object and the furthest point on the object in focus in the first and last photos of the sequence, respectively. Using the fact that the distance between camera and subject is constant and a different region of the object is in focus for each frame, it can be inferred that the regions in focus in each frame represent different depths. The system can identify these depth slices in the images by using blur subtraction or some other method.

Once the system has depth slices, cubic splines or some other interpolation method may be executed in order to construct an approximate 3D model of the surface of the object. Once that is done, surface normal calculation can be done by calculating the cross product of the partial derivatives in different directions, or by other means.

Focus staking may be performed for single image acquisition. For focus stacking there is a different kind of image averaging, namely how the images from different focus levels are patched together to avoid artifacts. With focus stacking, blur subtraction or an equivalent technique is used to isolate the depth slices from each focal stack image. The images, each of which now contain a slice of the original object, are overlaid in order construct a single all-in-focus image. Regions of overlap between slices can be minimized with dense focus stacking or simply averaged in the final result. Depending on the depth covered by the focus stacking and the lens used to take the images, focus "breathing" may become an issue. In these cases, the system (e.g., at least one processor) can compensate for the expansion/contraction of the field of view by shrinking/expanding the images such that the overlay is more seamless. Various image processing techniques can be employed.

Extracting from the model in three dimensions, given point of interest location. In one embodiment, the system (e.g., at least one processor) uses the three-dimensional positions on the surface of the model of the matched points of interest, but re-extracts their image-based characteristics. In other words, the system keeps the same set of points of interest, but recharacterizes their image-derived features as follows. Take the surface normal at a location (see below)

and project the image onto the tangent plane (the plane perpendicular to that normal vector). The system then re-extracts the image features from this new image (using the same techniques outlined above that characterized the points of interest in the individual images). This has several advantages over using the original characterizations, including, for example, the advantages described below.

First, the new extraction has, to first order, no scale, rotation, affine, homographic, or perspective, projective, or higher-order distortion while the original image, being captured fairly close to the face, likely has all of these distortions. As a result, matching points of interest taken from the model requires much less tolerance for variability. Experiments have repeatedly revealed that the greater the level of invariance that needs to be achieved in the characterizations of the points of interest, the less well those points of interest distinguish different objects from the correct one. This model building and subsequent recharacterization demonstrate again the advantage of the combination of techniques taught in this disclosure.

The distortions mentioned here are not those that must be corrected in order to get geometric matches. Those are distortions in the locations of the different members of candidate match pairs. Instead these distortions are the distortions within the region from which the image-based features of each particular point of interest were derived (that is, over a generally much smaller region). This may be viewed as the intra-point region rather than the region containing multiple neighboring points.

Additionally, the point of interest characterizations are based on the smoothed image created from all the matching images, rather than on just one of the images, and hence likely has greater consistency (and hence a greater likelihood of matching correctly). The merging process also likely removed spurious points of interest near the image boundaries.

Relocation and extraction from the model in three dimensions. In another embodiment, starting with the model but this time, instead of using the already-found locations of the points of interest and recharacterizing the region around them, the system (e.g., at least one processor) re-finds the points of interest using the surface images viewed down along the surface normals, and then characterizes the points of interest using the same methods as in the previous paragraph. The system can find the points of interest using, for example, the local Hessian of the illumination, or by other image-based means. The system can then characterize the points of interests as before, but this time using the image as seen in the tangent plane rather than the image as seen in the focal plane of any particular camera.

Additional Algorithms

Line suppression can be used to restrict the clustering of key points around hair, which is normally quite feature-dense. This allows the system to preferentially place points on skin texture. Several line suppression techniques work, but one preferred embodiment requires the two eigenvalues of the Hessian to be quite close to each other. This eliminates points of interest on lines because points of interest on lines tend to have one eigenvalue (corresponding to the eigenvector across the line) much larger in absolute value that the other eigenvalue.

Point of Interest aggregation. Rather than building a model and digitally fingerprinting the model, the points of interest from each image can be used for authentication. Two approaches for doing so include aggregating the digital fingerprints of each image into a single digital fingerprint of the object without first forming a model. Authentication would then be accomplished by comparing the aggregated digital fingerprint of the test object with similarly aggregated digital fingerprints in the reference set. Alternatively, individual image digital fingerprints of one acquisition can be compared against the aggregated digital fingerprints from the other acquisitions.

Matching Digital Fingerprints

Having addressed the deriving of the features to be used for matching, it is useful to describe the various techniques that may be employed for the matching itself. For single images, all the matching may be based on 2D characterizations of the surface of the hand. Because the hand is "malleable", the deformations from one acquisition to the next may be quite extensive and "rubber sheet" in nature. The differences in the hand between acquisitions may be ameliorated in two ways. First, there is the restraint within the structure of the hand imager that forces or urges the hand to a particular position and/or orientation. The structure is designed to make the person insert their hand so the post fits between a given pair (e.g., middle finger and ring finger) or between given pairs of digits (e.g., first post between thumb and index finger, second post between middle finger and ring finger) and where the hand is oriented more or less straight into the structure.

Object malleability such as distortions of the back of the hand caused by spreading of the fingers and the force of downward pressure by the hand onto the platform, is handled algorithmically. This is another way the hardware and the software work synergistically together to achieve better performance than may be otherwise achieved. Additionally, rubber sheet distortions in hand images may be significant. Rubber sheet distortions are not parameterizable with a fixed number of parameters, therefore, rubber sheet distortions must be approximated. Methods for approximating rubber sheet distortions are provided below.

Cumulate the matches for the found regions. The goal of the point matching process is to get an estimate of how likely the two acquisitions are to be from different appearances or sampling of the same object. To do this as accurately as possible, the method should find as many true matches across the object as possible. The simplest way to do this is called RARS (for RANSAC Approximate Rubber Sheeting) to accumulate match points garnered from multiple transforms rather than attempting to match the entire surface using a single transform. This process of using multiple transforms to describe the relationship between two objects translates, in practice, to the summing of true match points across multiple regions where the matched regions have different transform parameters. Using this approach, the method avoids having to do anything with the actual transform between the two acquisitions (which may be of high order) and still takes advantage of all true match pairs.

A second, related approach is LARS (Locally-Affine Rubber Sheeting). LARS takes advantage of the fact that any physically-realizable object transform can, when viewed over a small-enough region, be treated as though it were an affine transform. Local regions are matched using LARS with RANSAC choosing candidate match pairs subject to their geometric relationship in the two acquisitions being related by an affine transform. In essence, this approach follows the taught method until the best matching with local affine transforms are accomplished and then the true match points in the various regions are combined to measure overall match. LARS is a special case of a general matching approach: any transform of lower order than the actual transform will result in multiple regions each with a different parameter set. Those parameters describe the lower-order transform within the individual regions. It is possible, for example, to stop at finding local regions that match up to a level of similarity. LARS matches local regions up to an affinity and homography matches them up to an homography. As taught above, if homography is the highest-order transform may be tried into a pyramiding process, its regions are then linked together to get the overall matches. Thus LARS does for locally-affine regions what the standard technique does for locally-homographic regions when they are insufficient to cover most of the object in a single region (indicating that the actual transform is of higher order than homographic). The pyramiding process may be, for example, a transform pyramiding process as described in U.S. Provisional Application No. 63/014,680, "Transform Pyramiding for Fingerprint Matching System and Method" filed Apr. 23, 2020.

Exemplary Methods of Authentication Using Biometrics

Figure 5:
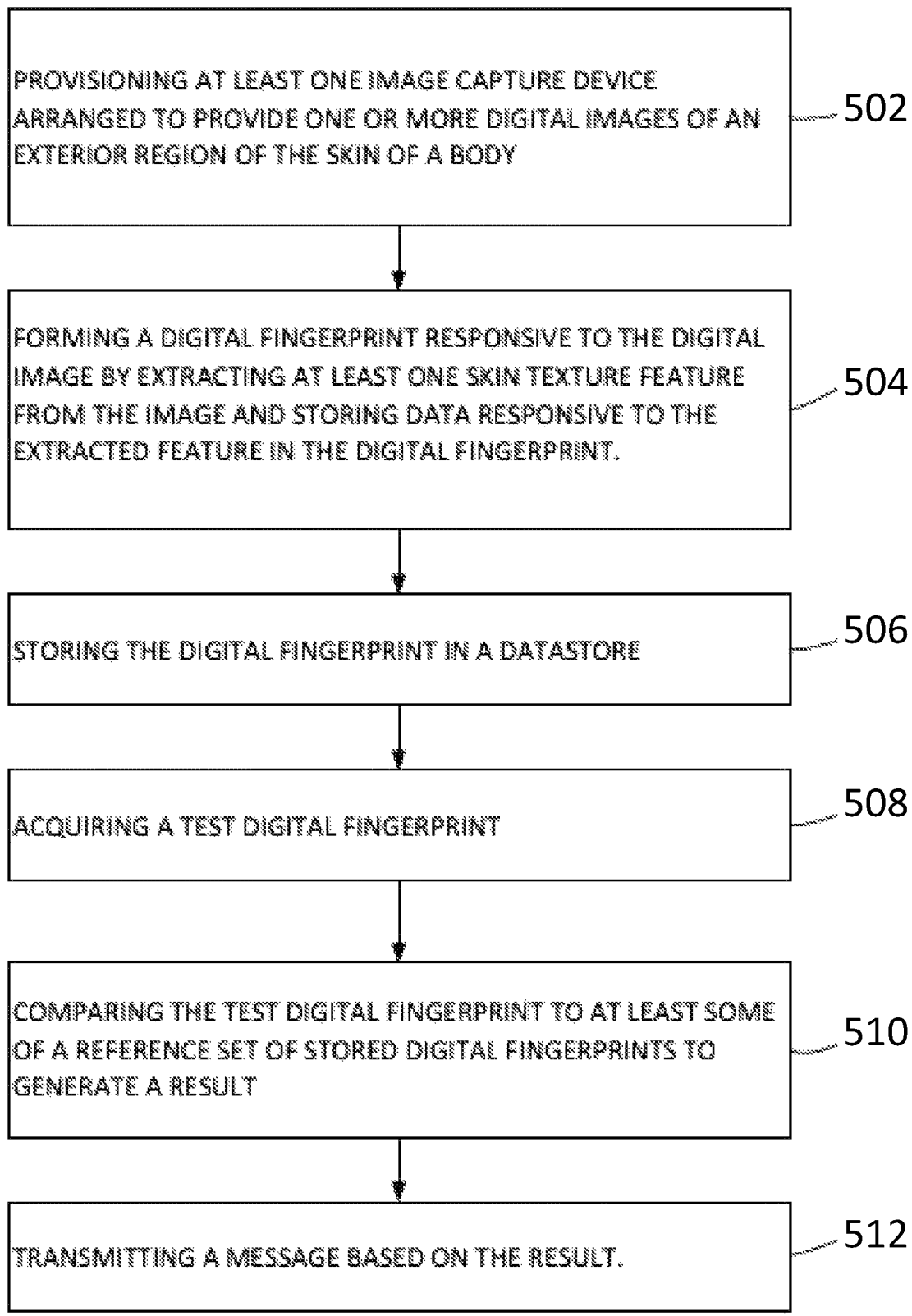
FIG. 5 is a flowchart of a method for authentication using hand biometrics, according to at least one illustrated implementation.

FIG. 5 illustrates one exemplary authentication process using biometrics.

As shown, to capture biometrics information (e.g., hand biometrics information), at least one image capture device is arranged to capture one or more digital images of an exterior region of the skin of a body (e.g., the back of a hand) at block 502. At block 504, a system (e.g., one or more processors) generates or forms a digital fingerprint, for example by extracting at least one skin texture feature from the image. The digital fingerprint may be responsive to the digital image and data response to the extracted feature(s) (e.g., feature vectors) in the digital fingerprint. At block 506, the digital fingerprint may be stored in the datastore. To begin authentication, a test or sample digital fingerprint may be acquired for a target object that the system will attempt to authenticate at block 508. At block 510, the test digital fingerprint may be compared to at least one reference of reference set of digital fingerprints for the target object stored in the datastore to generate a result. For example, the result may be an indication of authenticity or an indication or non-authenticity. At block 512, a message may be transmitted based on the result. The message may indicate, for example, whether or not the target object was authenticated and or the features the contributed to a determination of authenticity and or non-authenticity. An individual may even be authenticated without identifying the individual. For example, the system may determine that a sample digital fingerprint taken from an individual at one time, matches a reference digital fingerprint taken from an individual at a preceding time, where the absolute identity of the individual is either not known and/or not logically associated in memory with either the sample or reference digital fingerprints. As previously explained, the reference digital fingerprint may be logically associated with a defined set of access rights (e.g., access to a restricted area or vehicle, which may or may not be time limited), even if the absolute identity of the individual is either not known and/or not logically associated in memory with the reference digital fingerprints.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to."

Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system, comprising:
at least a first hand imager, the first hand imager comprising a structure having at least one wall that at least partially encloses an interior of the structure, the at least one wall having an opening sized to removably receive a human hand therethrough when inserted into the interior of the structure from an exterior of the structure, at least one image sensor with a field-of-view that is oriented to encompass at least a portion of the human hand when the human hand is inserted into the interior of the structure, the at least one image sensor operable to capture one or more images of at least the portion of the human hand while the human hand is inserted into the interior of the structure;
at least one processor, the at least one processor communicatively coupled to the at least one image sensor; and at least one non-transitory processor-readable storage medium communicatively coupled to the at least one processor and which stores processor-executable instructions.

2. The system of claim 1 wherein the first hand imager further includes at least a first alignment structure, the first alignment structure physically engageable by at least a portion of the human hand when the human hand is inserted into the interior of the structure to at least one of position or orient the human hand with respect to at least one of the at least one image sensor or the interior of the structure.

3. The system of claim 2 wherein the first alignment structure is an alignment post sized to be received between a defined pair of fingers of the human hand when the human hand is inserted into the interior of the structure.

4. The system of claim 1 wherein the first hand imager further includes at least one light source.

5. The system of claim 4 wherein the at least one light source comprises a lighting panel that extends across the interior of the structure to provide a balanced light field to the human hand when the human hand is inserted into the interior of the structure.

6. The system of claim 5 wherein the lighting panel of the first hand imager further includes a throughhole for accommodating at least one of the at least one image sensor of the field of view of the at least one image sensor.

7. The system of claim 1 wherein the at least one wall of the first hand imager is translucent allowing visual perception of the interior of the structure while substantially reducing the passage of at least one range of wavelengths of light into the interior of the structure from the exterior thereof.

8. The system of claim 1 wherein the first hand imager further includes an insertion tray with camera-to-hand registry and alignment post, the insertion tray detachably coupleable to the at least one wall of the structure as a bottom interior surface of the structure.

9. The system of claim 8 wherein the bottom interior surface of the structure has a depression approximating a profile of a palm and five digits of the human hand.

10. The system of claim 1 wherein the at least one image sensor is positioned and oriented to capture images of a portion of a back of the human hand when the human hand is inserted into the interior of the structure.

11. The system of claim 10 wherein the at least one image sensor is positioned and oriented to not image a palm or finger pad portions that carry the biological fingerprint features of the human hand when the human hand is inserted into the interior of the structure.

12. The system of claim 1 wherein the image sensor is part of a camera, and the first hand imager includes a single camera.

13. The system of claim 1 wherein the single camera has a focal point, and is positioned such that the focal is located at a back of the human hand when the human hand is inserted into the interior of the structure.

14. The system of claim 1 wherein the image sensor is part of a camera, and the first hand imager includes a more than one camera.

15. The system of claim 1 wherein the processor-executable instructions stored by the at least one non-transitory processor-readable storage medium, when executed by the at least one processor, cause the at least one processor to:
extract at least one skin texture feature from the one or more images of at least the portion of the human hand captured by the at least one image sensor; and
form a digital fingerprint based at least in part on the extracted at least one skin texture feature, the digital fingerprint which uniquely and anonymously identifies the human hand.

16. The system of claim 15 wherein the processor-executable instructions stored by the at least one non-transitory processor-readable storage medium, when executed by the at least one processor, cause the at least one processor to:
identify one or more points of interest in the one or more images of at least the portion of the human hand captured by the at least one image sensor, wherein the extraction of at least one skin texture feature is performed for each of the identified one or more points of interest.

17. The system of claim 15 wherein the processor-executable instructions stored by the at least one non-transitory processor-readable storage medium, when executed by the at least one processor, cause the at least one processor to:
normalize out at least one of variations or changes that occur on scales larger than a scale of regions from which of a point of interest is identified.

18. The system of claim 15 wherein to normalize out at least one of variations or changes, when executed by the at least one processor, the processor-executable instructions cause the at least one processor to:
normalize at least one of an absolute illumination, a blur, a scale, an angle of view, or distortion in the captured images of the hand.

19. The system of claim 15 wherein the at least one image sensor captures multiple images at different respective focal planes while the human hand is inserted into the interior of the structure, and wherein the processor-executable instructions stored by the at least one non-transitory processor-readable storage medium, when executed by the at least one processor, cause the at least one processor to:
combine two or more of the captured multiple images captured at the different respective focal planes.

20. The system of claim 15 wherein the processor-executable instructions stored by the at least one non-transitory processor-readable storage medium, when executed by the at least one processor, cause the at least one processor to:
merge multiple images of a same area of hand or overlapping images that include a same area of the hand to form a single image from which points of interest are extracted.

21. The system of claim 20 wherein to merge multiple images of a same area of hand or overlapping images, when executed by the at least one processor, the processor-executable instructions cause the at least one processor to:
perform at least one of: a pixel-by-pixel average, a pixel-by-pixel median, or weight each pixel by a distance from an edge of the field of view of the at least one image sensor.

22. The system of claim 15 wherein the processor-executable instructions stored by the at least one non-transitory processor-readable storage medium, when executed by the at least one processor, cause the at least one processor to:
cause the digital fingerprint to be saved to a datastore as a reference digital fingerprint for later use in authentication.

23. The system of claim 15 wherein the processor-executable instructions stored by the at least one non-transitory processor-readable storage medium, when executed by the at least one processor, cause the at least one processor to:
compare the digital fingerprint to a reference digital fingerprint; and
produce a result of the comparison.

24. The system of claim 23 wherein the processor-executable instructions stored by the at least one non-transitory processor-readable storage medium, when executed by the at least one processor, cause the at least one processor to:
transmit a notification of the result of the comparison.

25. A method of operating at least a first hand imager, the first hand imager comprising a structure having at least one wall that at least partially encloses an interior of the structure, the at least one wall having an opening sized to removably receive a human hand therethrough when inserted into the interior of the structure from an exterior of the structure, at least one image sensor with a field-of-view that is oriented to encompass at least a portion of the human hand when the human hand is inserted into the interior of the structure, the at least one image sensor operable to capture one or more images of at least the portion of the human hand while the human hand is inserted into the interior of the structure, at least one processor, the at least one processor communicatively coupled to the at least one image sensor; and at least one non-transitory processor-readable storage medium communicatively coupled to the at least one processor and which stores processor-executable instructions, the method comprising:

receiving a human hand in the interior of the structure;
illuminating the human hand while the human hand is in the interior of the structure;
capturing one or more images of at least a portion of the human hand while the human hand is in the interior of the structure;
extracting a number of features from the captured images; and
generating a digital fingerprint from the extracted features, the digital fingerprint which uniquely identifies a human.

26. The method of claim 25 wherein generating a digital fingerprint from the extracted features includes generating a digital fingerprint which uniquely and anonymously identifies the human.

27. The method of claim 25, further comprising:
storing the digital fingerprint to an anonymized dataset without any association to a name of the human.

28. The method of claim 25, further comprising:
storing the digital fingerprint to an anonymized dataset with a logical association to a set of access rights.

* * * * *